United States Patent
Lin et al.

(10) Patent No.: US 6,827,685 B2
(45) Date of Patent: Dec. 7, 2004

(54) METHOD OF ULTRASONIC SPECKLE REDUCTION USING WIDE-BAND FREQUENCY COMPOUNDING WITH TISSUE-GENERATED HARMONICS

(75) Inventors: Feng Lin, Waukesha, WI (US); Satchi Panda, Greenfield, WI (US); Richard Yung Chiao, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 10/335,277

(22) Filed: Dec. 31, 2002

(65) Prior Publication Data

US 2004/0127795 A1 Jul. 1, 2004

(51) Int. Cl.[7] .................................................. A61B 8/00
(52) U.S. Cl. ..................................................... 600/437
(58) Field of Search ................................ 600/437–472; 367/7, 11, 130, 138; 73/625–634; 128/916

(56) References Cited

U.S. PATENT DOCUMENTS

| | | | |
|---|---|---|---|
| 4,561,019 A | | 12/1985 | Lizzi et al. |
| 5,623,928 A | * | 4/1997 | Wright et al. ................ 600/447 |
| 5,667,373 A | * | 9/1997 | Wright et al. ................ 600/443 |
| 5,793,701 A | * | 8/1998 | Wright et al. .................... 367/7 |
| 5,957,852 A | | 9/1999 | Hassack et al. |
| 6,016,285 A | * | 1/2000 | Wright et al. .................. 367/11 |
| 6,050,942 A | * | 4/2000 | Rust et al. ................... 600/437 |
| 6,071,240 A | * | 6/2000 | Hall et al. ................... 600/443 |

\* cited by examiner

*Primary Examiner*—Ali Imam
(74) *Attorney, Agent, or Firm*—Joseph S. Heino; Patrick M. Bergin; Carl B. Horton

(57) ABSTRACT

A method and apparatus for smoothing speckle pattern and increasing contrast resolution in ultrasound images is provided. Compared to other frequency compounding techniques, wide-band harmonic frequency compounding reduces speckle noise without sacrificing the resolution. Compared to spatial compounding, wide-band harmonic frequency compounding is more robust against tissue motion because sequential vectors rather than frames are summed together for compounding. The method and apparatus is implemented by transmitting two or more firings, combining two or more of the firings coherently to extract the tissue-generated harmonic components, detecting the outputs of the coherent sums and detecting one or more firings before coherent sum, and finally combining all detected outputs to form the compounded image. The method and apparatus sums wide-band fundamental and wide-band harmonic images after detection to form a compounded image. Unlike other frequency compounding methods, both transmit and receive signals are wide-band and no narrow-band filters are necessary. Multiple firings with two or more different transmit waveforms are transmitted to each focal zone.

20 Claims, 5 Drawing Sheets

METHOD OF ULTRASONIC SPECKLE REDUCTION USING WIDE-BAND FREQUENCY COMPOUNDING WITH TISSUE-GENERATED HARMONICS

BACKGROUND OF THE INVENTION

The present invention relates to ultrasound imaging, and more particularly, to a method and apparatus for enhancing ultrasound images by reducing speckle.

Ultrasound imaging is an attractive modality for numerous diagnostic procedures because of its non-invasive nature, relatively low cost, and lack of radiation exposure. Medical ultrasound images are typically produced by generating an ultrasonic sound wave traveling in a known direction, known as a scan line or a vector, and observing the echoes created when the sound wave is scattered or bounces off of the boundaries between regions of differing density in the body. For any given direction of the ultrasound beam, the image pixels are generated by plotting a dot whose brightness is proportional to the echoes' amplitude at a coordinate whose location is a function of the time after a short ultrasound pulse is sent in the direction of the scan line being measured.

When forming images with coherent radiation, the desired distribution of image energy is subject to undesirable random modulation. This random distribution of energy is known as "speckle" and is manifested in visual images as flecks of random intensity and size distributed across the image. Speckle arises from constructive and destructive interference due to random phase cancellations and additions of the coherent field which is scattered by the coherently illuminated object. The power spectrum of speckle depends upon the spectrum of the coherent signal carrier, the texture or spatial distribution of scatterers in the field, the size of the irradiated object volume, and the transfer function of the receiving and imaging system.

The speckle caused by random tissue scattering and ultrasonic images may overshadow delicate tissue structures and degrade the image contrast. Frequency compounding is a well-known way to reduce speckles and hence enhance contrast resolution. In frequency compounding, images with different frequency characteristics are summed incoherently. In the experience of these inventors, existing frequency compounding methods for speckle reduction suffer from resolution degradation due to summation of detected narrow-band signals. These narrow-band signals are typically obtained by narrow-band filtering on receipt. What is needed is a high-resolution compounding method and apparatus.

Broadly, it is the object of the present invention to provide an improved method and apparatus for ultrasound imaging.

It is another object of the present invention to provide an improved ultrasonic imaging method and apparatus that can distinguish tissues while reducing the amount of speckle that overshadows delicate structures and degrades the image contrast. It is yet another object of the present invention to provide such a method and apparatus while using wide-band frequency compounding with tissue-generated harmonics. These and other objects of the present invention will become apparent to those skilled in the art from the follow detailed description of the invention and the accompanying drawings.

BRIEF SUMMARY OF THE INVENTION

The present invention is a method and apparatus for smoothing the speckle pattern and increasing contrast resolution in ultrasound images. Compared to other frequency compounding techniques, wide-band harmonic frequency compounding reduces speckle noise without sacrificing the resolution. Compared to spatial compounding, wide-band harmonic frequency compounding is more robust against tissue motion because sequential vectors rather than frames are summed together for compounding. The method and apparatus of the present invention is implemented by transmitting two or more firings, combining two or more of the firings coherently to extract the tissue-generated harmonic components, detecting the outputs of the coherent sums and detecting one or more firings before coherent sum, and finally combining all detected outputs to form the compounded image.

The method and apparatus of the present invention sums wide-band fundamental and wide-band harmonic images after detection to form a compounded image. Unlike other frequency compounding methods, both transmit and receive signals are wide-band and no narrow-band filters are necessary. Multiple firings with two or more different transmit waveforms are transmitted to each focal zone.

DETAILED DESCRIPTION OF THE INVENTION

In general, an ultrasound beam is generated by using an array of transducers to form a transmit beam in a given direction with respect to the array. The ultrasound pulse is an amplitude modulated pulse at a predetermined frequency, having an amplitude specified by an envelope function. The echoes generated by this pulse are detected by the same, or a different, array of transducers that are used to form a receive beam corresponding to the transmit beam. The directional sensitivity of the microphone, or ultrasonic probe, reduces echoes generated by multiple reflections of the sound pulse.

Figure 1:
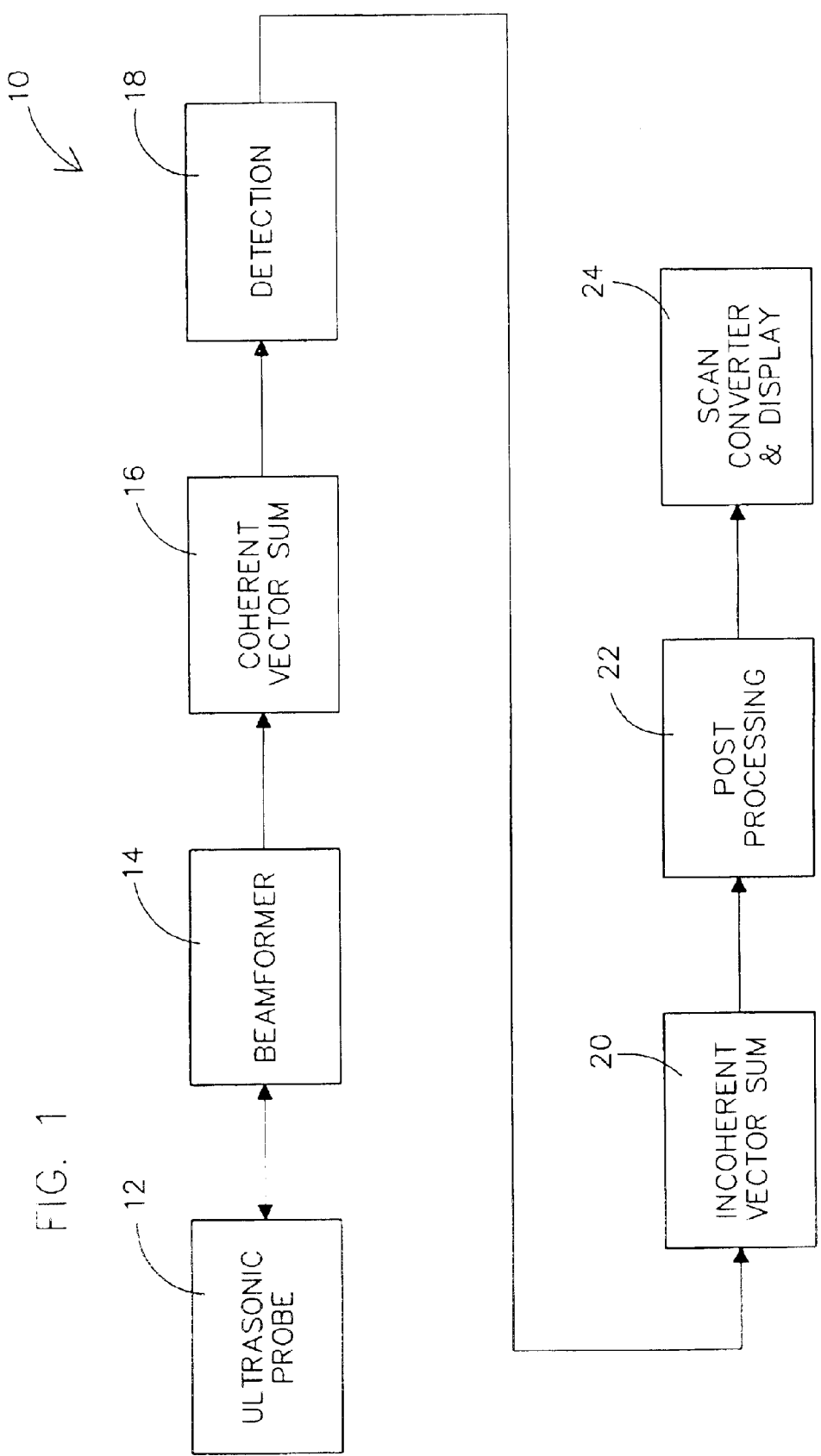
FIG. 1 is a block diagram of an ultrasound imaging system according to the present invention.

The ultrasound imaging is generally accomplished by a system that utilizes certain essential components. Referring now to FIG. 1, which is a block diagram of an ultrasound imaging system according to the method of the present invention, the ultrasound imaging system is generally identified 10. The system 10 includes an ultrasonic probe 12, a beamformer 14, a coherent vector summation means 16, a detection means 18, an incoherent vector summation means 20, a post-processing means 22 and a scan converter and display means 24. In general, the ultrasonic probe 12 is aligned with the object to be scanned and the operator uses the scan converter and display means 24 to visualize and observe the scan results as detected by the probe 12.

This invention sums wide-band fundamental and wide-band harmonic images after detection to form a compounded image. Unlike other frequency compounding methods, both transmit and receive signals are wide-band and no narrow-band filters are necessary. Multiple firings with two or more different transmit waveforms are transmitted to each focal zone.

Figure 2:
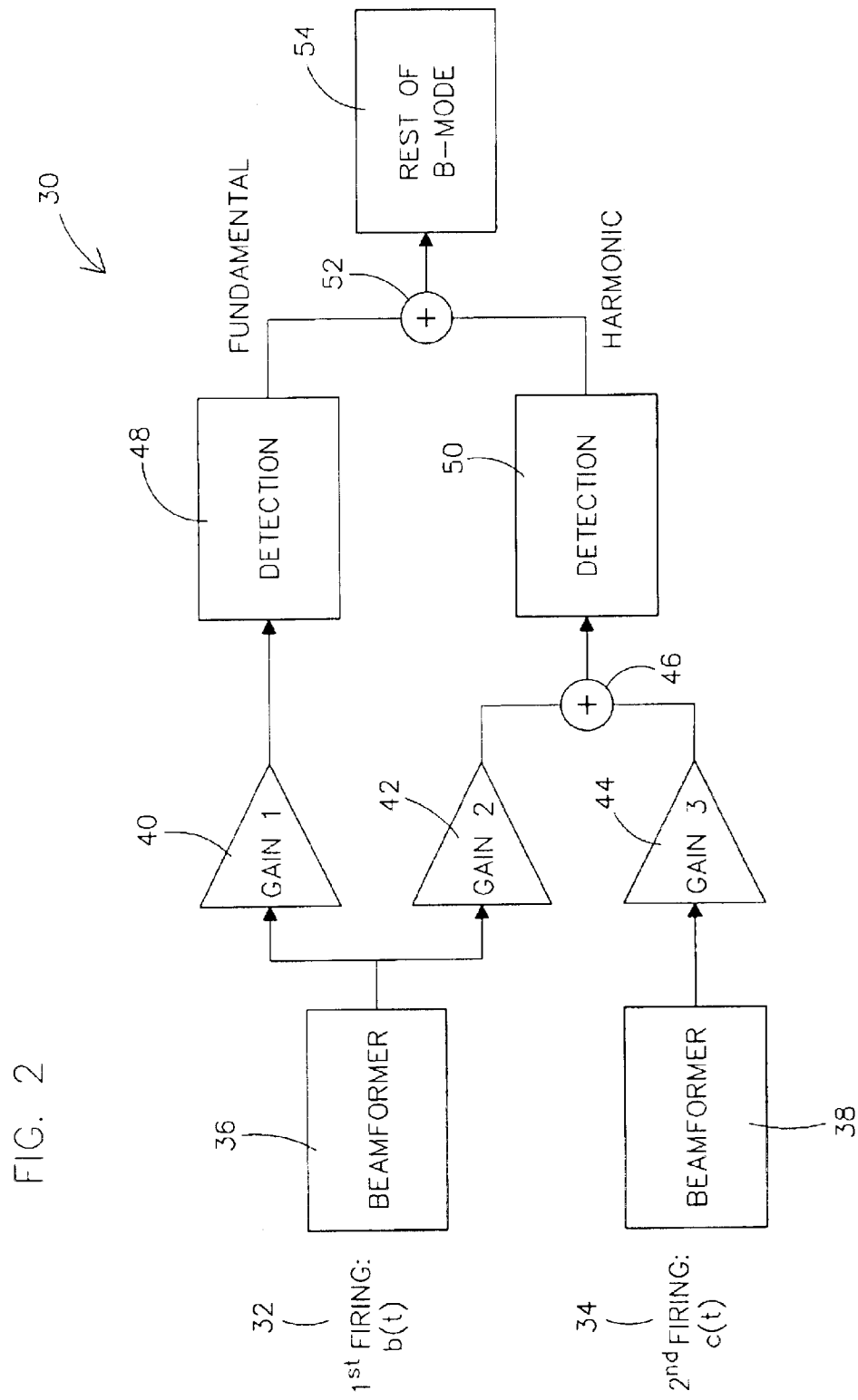
FIG. 2 is a schematic diagram illustrating the two-firing configuration in the method of the present invention.
Figure 3:
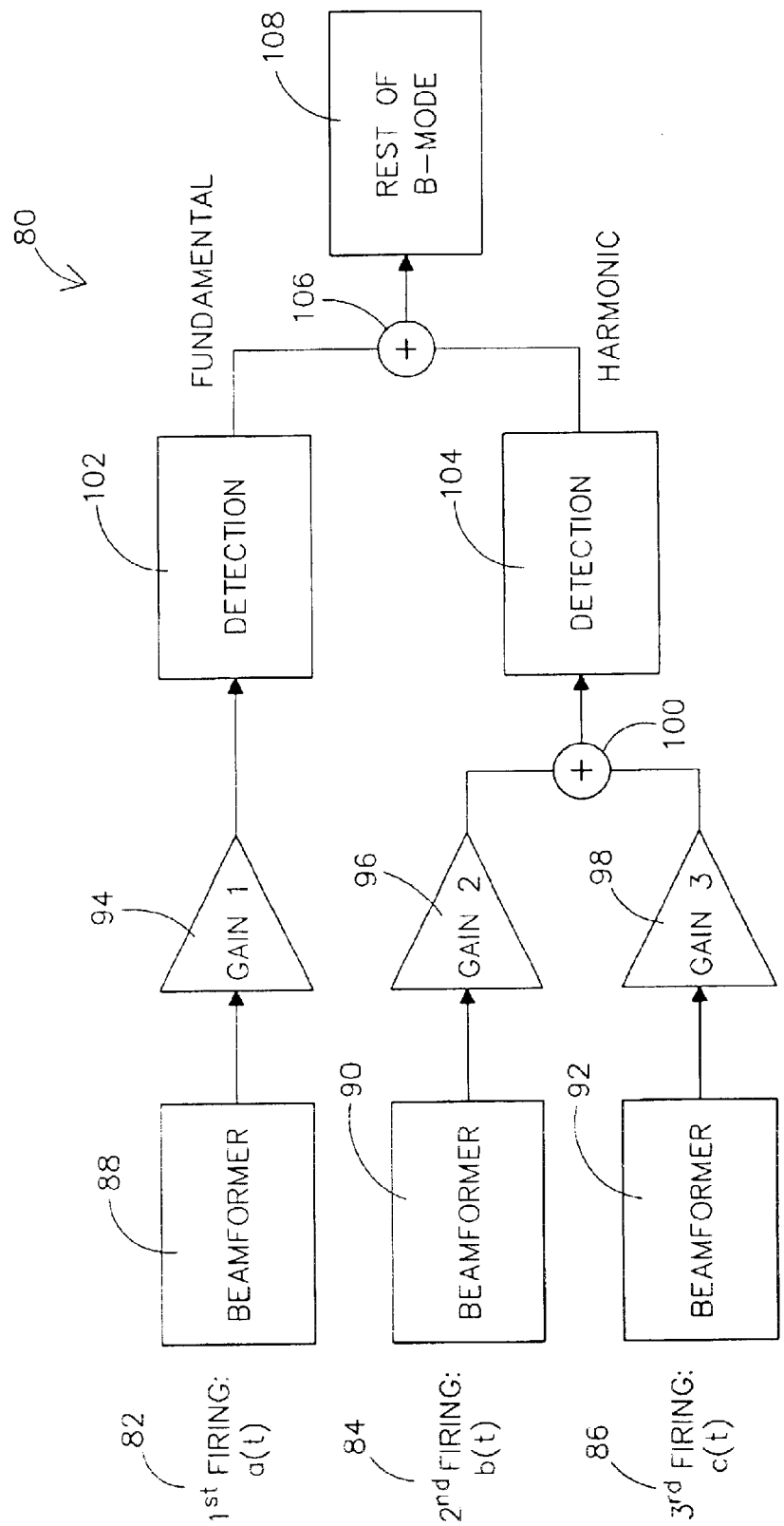
FIG. 3 is a schematic diagram illustrating the three-firing configuration in the method of the present invention

The method and apparatus of the present invention teaches compounding of wide-band images with different speckle patterns to suppress speckle without resolution loss. This is implemented by transmitting two or more firings, as shown by FIGS. 2 and 3, combining two or more of the firings coherently to extract the tissue-generated harmonic component, detecting output of the coherent sum and detecting one or more firings before coherent sum, and finally combining all detected outputs to form the compounded image. See also FIGS. 4 and 5.

Referring now to FIGS. 2 through 5, it will be seen that the transmit waveforms 62, 64, 110 generated by the beamformers 36, 38, 88, respectively, are characterized by a peak power level near a fundamental frequency $f_o$. The transmit waveforms 112, 114 generated by the beamformers 90, 92, respectively, are characterized by a peak power level near another fundamental frequency $f_1$. The ultrasound echo information generated by the beamformers includes information at the fundamental frequency and information generated non-linearly at the harmonic frequency. The echo information received by the beamformers is not filtered as in other prior methods to isolate the harmonic frequency information by substantially removing information at transmitted frequencies. In one embodiment, a wide-band harmonic image at $2f_o$ is incoherently summed with a wide-band fundamental image at $f_o$ and $2f_o$ to form the final compounded image. There may be two firings or three firings for each focal zone.

Figure 4:
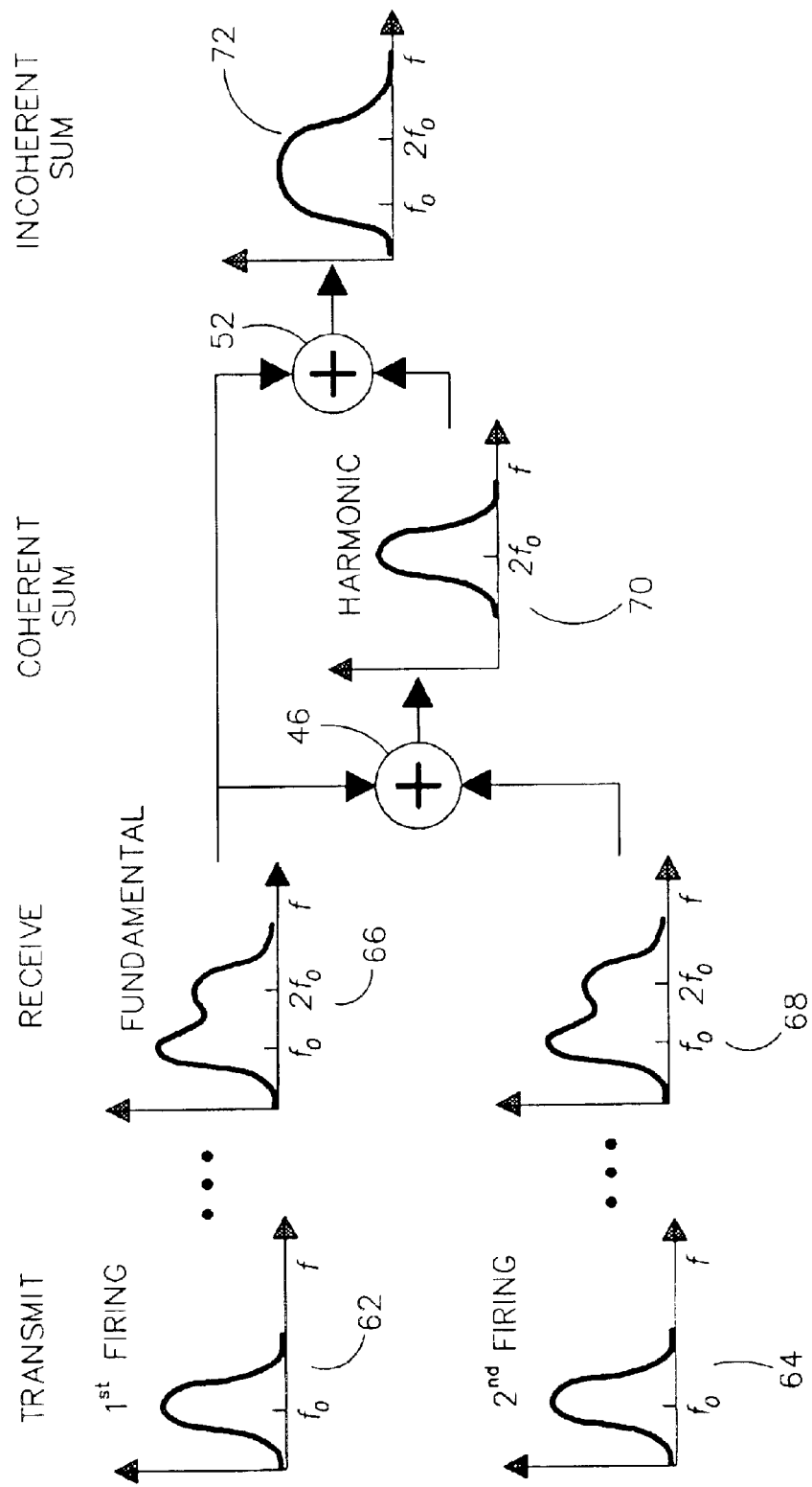
FIG. 4 is a spectrum diagram illustrating summation under the two-firing configuration shown in FIG. 2.

Referring now to FIGS. 2 and 4, a two-firing configuration, generally identified 30, is illustrated in schematic form. In the two-firing configuration 30, the wide-band transmit waveforms 62, 64 of the two-firings 32, 34 at frequency $f_o$ have the same amplitude but opposite phase. In other words, that situation would be represented by c(t)=−b(t). The received signals 66 of one of the firings 62 is detected 48 to form a wide-band fundamental vector, also at $f_o$. The received signals 66, 68 of the two-firings 32, 34 are summed 46 with equal weighting, i.e. Gain 2=Gain 3 42, 44, and are detected 50 to form a wide-band harmonic vector 70 at $2f_o$. The two vectors 66, 70 are then summed 52 to form the compounded image 72. The weighting Gain 1 40 is set to a certain value so that the speckle of the fundamental image and the harmonic image has approximately the same brightness.

Figure 5:
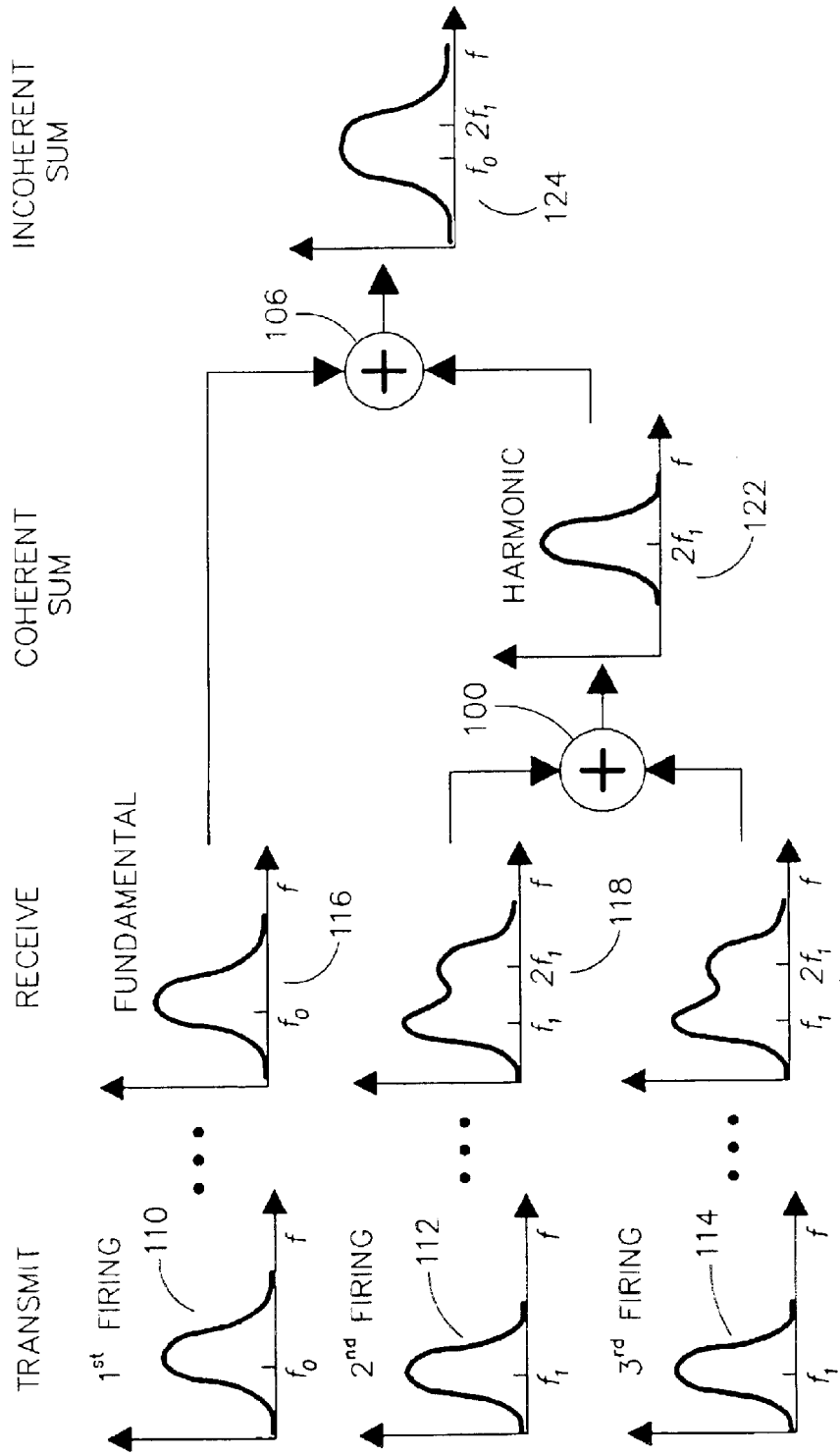
FIG. 5 is a spectrum diagram illustrating summation under the three-firing configuration shown in FIG. 3.

In the three-firing setting, generally identified 80, as shown in FIGS. 3 and 5, the first firing 82 with transmit waveform a(t) 110 is used to form a wide-band fundamental vector 116. The other two firings 84, 86 with transmit waveforms b(t) 112 and c(t) 114 with the same amplitude and opposite phase are combined 100 to form a wide-band harmonic vector 122. The transmit waveform a(t) 110 is different from b(t) 112 and c(t) 114. The two vectors 116, 122 are then summed 106 to form the compounded image 124. The gain setting 94, 96, 98 in this configuration 80 is the same as that in the two-firing case 30. The two-firing configuration 30 gives higher frame rate while the three-firing configuration 80 ensures optimized quality for both fundamental and harmonic images.

In another embodiment, the wide-band harmonic image is obtained by firing two wide-band waveforms with the same phase but different amplitudes. The two-firings are then coherently summed with Gain 3=−Gain 2/β to cancel the fundamental and extract the harmonic component. The same two-firing or three-firing settings stated above may be used in this embodiment.

In yet another embodiment, detection and log compression are performed prior to the summation of fundamental and harmonic vectors. This is equivalent to multiplying the detected vectors together for compounding.

It should also be understood that the foregoing embodiments could be extended to other multiple firing and wide-band compounding combinations that can be generally expressed as follows. First, two or more ultrasound firings would be made. These firings would be divided into several groups. In this way, each group can share firings with other groups. For groups with more than one firing, the firings would be coherently combined to form tissue-generated harmonic components. The harmonic components can include sub-harmonic, ultra-harmonics, $2^{nd}$ order harmonic, and higher order harmonic. The number of groups with more than one firing could be one or more. The number of groups with one firing could also be one or more. For each group, the output of the coherent sum is detected in the case of two or more firings and the firing is directly detected in the case of one firing. All detected outputs are combined to form the compounded image as described above.

Accordingly, it will be seen that the present invention is a method and apparatus for smoothing the speckle pattern and increasing contrast resolution in ultrasound images. Compared to other frequency compounding techniques, wide-band harmonic frequency compounding reduces speckle noise without sacrificing resolution. Compared to spatial compounding, wide-band harmonic frequency compounding is more robust against tissue motion because sequential vectors rather than frames are summed together for compounding. The method and apparatus of the present invention is implemented by transmitting two or more firings, combining two or more of the firings coherently to extract the tissue-generated harmonic component, detecting the output of the coherent sum and detecting one or more firings before coherent sum, and finally combining all detected outputs to form the compounded image.

The method and apparatus of the present invention sums wide-band fundamental and wide-band harmonic images after detection to form a compounded image. Unlike other frequency compounding methods, both transmit and receive signals are wide-band and no narrow-band filters are necessary. Multiple firings with two or more different transmit waveforms are transmitted to each focal zone. It is intended that the foregoing be regarded as illustrative of the method of the present invention, rather than limiting. It is the following claims that are intended to define the scope of this invention.

Parts List 10 ultrasound imaging system
12 ultrasonic probe
14 beamformer
16 coherent vector summation means
18 detection means
20 incoherent vector summation means
22 post-processing means
24 scan converter and display means
30 two-firing configuration
32 first firing
34 second firing
36 beamformer
38 beamformer
40 gain 1
42 gain 2
44 gain 3
46 summation
48 detector 50 detection
52 summation
54 rest of b-mode
62 transmit waveform generated by 36
64 transmit waveform generated by 38
66 received signal
68 received signal
70 vector
72 compounded image
80 three-firing configuration
82 first firing
84 second firing
86 third firing
88 beamformer
90 beamformer
92 beamformer
94 gain 1
96 gain 2
98 gain 3
100 summation
102 detection
104 detection
106 summation
108 rest of b-mode
110 transmit waveform generated by 88
112 transmit waveform generated by 90
114 transmit waveform generated by 92
116 wide-bond fundamental vector
118 receive vector
120 receive vector
122 wide-band harmonic vector
124 compounded image

What is claimed is:

1. In a method or a system for generating an ultrasound image in which ultrasound pulses comprising amplitude modulated signals are transmitted into a specimen and echoes generated by the ultrasound pulses are received from the specimen, a method for reducing speckle in the resulting ultrasound image comprising the steps of
   (a) transmitting two or more ultrasound firings, said transmitting step including transmitting at least a first wide-band waveform and a second wide-band waveform at a fundamental frequency,
   (b) combining two or more of the firings coherently to extract the tissue-generated harmonic components thereof,
   (c) detecting the outputs of the coherent sums and detecting one or more firings before coherent sum, and
   (d) combining all detected outputs to form the compounded image.

2. The method of claim 1 wherein said firing detection step includes detecting the received signals of the first waveform to form a wide-band fundamental vector output and combining and detecting the received signals of the first and second waveforms to form a wide-band harmonic vector output.

3. The method of claim 1 wherein the received signals of the two or more firings are summed with equal gain and the received signals of one of the firings is given a weighted gain so that speckle of the fundamental image and the harmonic image has approximately the same brightness.

4. The method of claim 1 wherein a wide-band harmonic image is obtained by firing two or more waveforms with the same shape but different amplitude, coherently summing the firings with gain set so as to cancel the fundamental component and extract the harmonic component.

5. The method of claim 1 wherein the harmonic components can be sub-harmonic, ultra-harmonic, second order harmonic, or higher order harmonic.

6. An ultrasonic method for generating data for imaging and for reducing speckle comprising the steps of
   (a) transmitting two or more ultrasound firings, said transmitting step including at least transmitting a first wide-band waveform and a second wide-band waveform at a fundamental frequency,
   (b) combining two or more of the firings coherently to extract the tissue-generated harmonic components thereof,
   (c) detecting the outputs of the coherent sums and detecting one or more firings before coherent sum, and
   (d) combining all detected outputs to form the compounded image.

7. The method of claim 6 wherein said firing detection step includes detecting the received signals of the first waveform to form a wide-band fundamental vector output and combining and detecting the received signals of the first and second waveforms to form a wide-band harmonic vector output.

8. The method of claim 6 wherein the received signals of the two or more firings are summed with equal gain and the received signals of one of the firings is given a weighted gain so that speckle of the fundamental image and the harmonic image has approximately the same brightness.

9. The method of claim 6 wherein a wide-band harmonic image is obtained by firing two or more waveforms with the same shape but different amplitude, coherently summing the firings with gain set so as to cancel the fundamental component and extract the harmonic component.

10. The method of claim 6 wherein the harmonic components can be sub-harmonic, ultra-harmonic, second order harmonic, or higher order harmonic.

11. An ultrasonic imaging method comprising the following steps
    (a) transmitting two or more ultrasound firings, said transmitting step including transmitting at least a first wide-band waveform and a second wide-band waveform at a fundamental frequency,
    (b) combining two or more of the firings coherently to extract the tissue-generated harmonic components thereof,
    (c) detecting the outputs of the coherent sums and detecting one or more firings before coherent sum, and
    (d) combining all detected outputs to form the compounded image, whereby speckle in the image is reduced.

12. The method of claim 11 wherein said firing detection step includes detecting the received signals of the first waveform to form a wide-band fundamental vector output and combining and detecting the received signals of the first and second waveforms to form a wide-band harmonic vector output.

13. The method of claim 11 wherein the received signals of the two or more firings are summed with equal gain and the received signals of one of the firings is given a weighted gain so that speckle of the fundamental image and the harmonic image has approximately the same brightness.

14. The method of claim 11 wherein a wide-band harmonic image is obtained by firing two or more waveforms with the same shape but different amplitude, coherently summing the firings with gain set so as to cancel the fundamental component and extract the harmonic component.

15. The method of claim 11 wherein the harmonic components can be sub-harmonic, ultra-harmonic, second order harmonic, or higher order harmonic.

16. An ultrasound imaging apparatus which comprises
(a) an ultrasonic probe,
(b) one or more beamformers, said beamformers further comprising means for transmitting a first wide-band waveform and a second wide-band waveform at a fundamental frequency via the probe,
(c) a coherent vector summation means,
(d) a detection means, said detection means having being capable of detecting ultrasound echo information at the fundamental frequency and detecting information generated non-linearly at the harmonic frequency,
(e) an incoherent vector summation means,
(f) a post-processing means, and
(g) a scan converter and image display means, whereby speckle in the resulting displayed image is reduced.

17. The apparatus of claim 16 wherein said detection means includes means for detecting the received signals of the first waveform to form a wide-band fundamental vector output and combining and detecting the received signals of the first and second waveforms to form a wide-band harmonic vector output.

18. The apparatus of claim 16 including detection means wherein the received signals of two or more firings are summed with equal gain and the received signals of one of the firings is given a weighted gain so that speckle of the fundamental image and the harmonic image has approximately the same brightness.

19. The apparatus of claim 16 wherein a wide-band harmonic image is obtained by firing two or more waveforms with the same shape but different amplitude, coherently summing the firings with gain set so as to cancel the fundamental component and extracting the harmonic component therefrom.

20. The apparatus of claim 16 wherein the harmonic components can be sub-harmonic, ultra-harmonic, second order harmonic, or higher order harmonic.

* * * * *